United States Patent
Sundararaman et al.

(10) Patent No.: US 6,772,293 B2
(45) Date of Patent: Aug. 3, 2004

(54) SYSTEM AND METHOD FOR OPTIMIZING MEMORY BUS BANDWIDTH UTILIZATION BY REQUEST CLASSIFICATION AND ORDERING

(75) Inventors: Ramacharan Sundararaman, Aloha, OR (US); Gustavo P. Espinosa, Portland, OR (US); JunSeong Kim, Hillsboro, OR (US); Ryan L. Carlson, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 505 days.

(21) Appl. No.: 09/748,979

(22) Filed: Dec. 27, 2000

(65) Prior Publication Data

US 2002/0083277 A1 Jun. 27, 2002

(51) Int. Cl.[7] ............................................. G06F 12/00
(52) U.S. Cl. ..................................................... 711/133
(58) Field of Search ................................. 711/118, 133

(56) References Cited

U.S. PATENT DOCUMENTS

| | | | |
|---|---|---|---|
| 4,959,771 A | * | 9/1990 | Ardini et al. ................ 711/136 |
| 5,584,038 A | | 12/1996 | Papworth et al. |
| 6,134,634 A | * | 10/2000 | Marshall et al. ............. 711/143 |
| 6,460,114 B1 | * | 10/2002 | Jeddeloh ...................... 711/120 |
| 6,473,832 B1 | * | 10/2002 | Ramagopal et al. ......... 711/118 |

* cited by examiner

Primary Examiner—Kevin L. Ellis
(74) Attorney, Agent, or Firm—Kenyon & Kenyon (57) ABSTRACT

Mechanisms for improving the efficiency of bus-request scheduling are provided. In a read-write segregation mechanism the type of a selected entry in a buffer is determined. If the type of the selected entry matches the type of the last issued entry, or if there are no further entries in the buffer that match the last issued entry, the request is issued to the system bus. A temporal ordering mechanism associates a request sent to a buffer with an identifier, the identifier designating a time at which the request was originally generated. The request identifier is modified when a prior request is issued, and thereby reflects a history of prior issuances. A request is issued when the historical information recorded in the identifier indicates that the request is the earliest-issued pending request in the buffer. A third mechanism for increasing the efficiency of bus request scheduling in a buffer includes segregating lower priority cache eviction requests in a separate write-out section of the buffer. Request entries in the write-out section are issued to a system bus only when there are no pending entries in a bus queue.

21 Claims, 6 Drawing Sheets

SYSTEM AND METHOD FOR OPTIMIZING MEMORY BUS BANDWIDTH UTILIZATION BY REQUEST CLASSIFICATION AND ORDERING

FIELD OF THE INVENTION

The present invention relates to instruction and data requests sent from a microprocessor to system memory, and in particular relates to mechanisms to improve the scheduling of requests onto a system bus.

BACKGROUND OF THE INVENTION

Microprocessors send read and write requests to load data from or store data in various memory locations. Such memory locations include local sources within the microprocessor unit, known as local caches, and also include external system memory. To communicate requests with the system memory, requests are first placed on a system bus that operates at a bus clock rate that is often lower than the microprocessor clock rate. Due in part to the lower system clock rate, it is generally more efficient to execute requests via the local caches than the system memory. However, use of the local caches is limited by their relatively finite memory resources.

To take advantage of the limited, but more efficient resources of the local caches, requests may first be sent to the local caches for execution, whereupon if the local caches do not contain the relevant data the request is rejected and then scheduled to be placed onto the system bus. Such requests are called "pending" requests, waiting to be placed on the system bus having exhausted local resources.

But before requests are sent to either local or system memory, they are generally temporarily stored in a request queue in a buffer. In one type of buffer, known as a circular buffer, a pointer steps consecutively through accumulated request entries, automatically starting at the beginning again after the end of the buffer has been reached. When the pointer reaches a pending request, that entry is placed onto the system bus for communication to system memory.

The general bus-request scheduling system described often operates sub-optimally because there is no mechanism to distinguish between read and write requests. Each time a read request and a write request are executed in succession, or vice versa, a turnaround time penalty is paid in switching from one request type to the other.

Another problem associated with the circular buffer scheduling system is that requests issued from the microprocessor that are designed to be executed in a particular order may be placed onto the system bus out of order. The reordering occurs because of the rotation of the buffer pointer and also because of differences in processing latency between the local caches and system memory.

Furthermore, the circular buffer system has no means to distinguish low priority cache eviction requests from regular read and writes. Cache eviction requests arise when a local cache is filled to capacity. When read requests are executed and data is retrieved from system memory, an entry is allocated within a local cache to store the retrieved data. In the process of allocating a new entry, other entries may need to be evicted from the cache. However, the data that the local cache eliminates may contain updated information that is not reflected in system memory. To ensure that the data is not lost completely, the evicted data needs to be loaded into system memory as a precaution. This necessary measure, however, should not necessarily be attributed with the same priority as a regular read or write request because the data may not be required for some time.

DETAILED DESCRIPTION

Three mechanisms are provided which can be used separately or concurrently to improve bus-request scheduling in buffer systems. The mechanisms are programmed into hardware within a microprocessor and are performed directly upon a request buffer. Although the discussion below assumes a circular buffer implementation, the present invention can be applied equally to other buffer implementations.

Embodiments of the first mechanism segregate read and write requests. Requests are scheduled to groups of requests containing only read requests or containing only write requests onto the system bus, reducing turnaround time. Embodiments of the second mechanism maintain the relative order of classes of requests as they are received, in the same order they were issued by the microprocessor. Embodiments of the third mechanism, called a lazy writeback mechanism for cache evictions, restrict delivery of cache evictions to the system bus to points in time when there are no remaining pending read or write requests.

Figure 1:
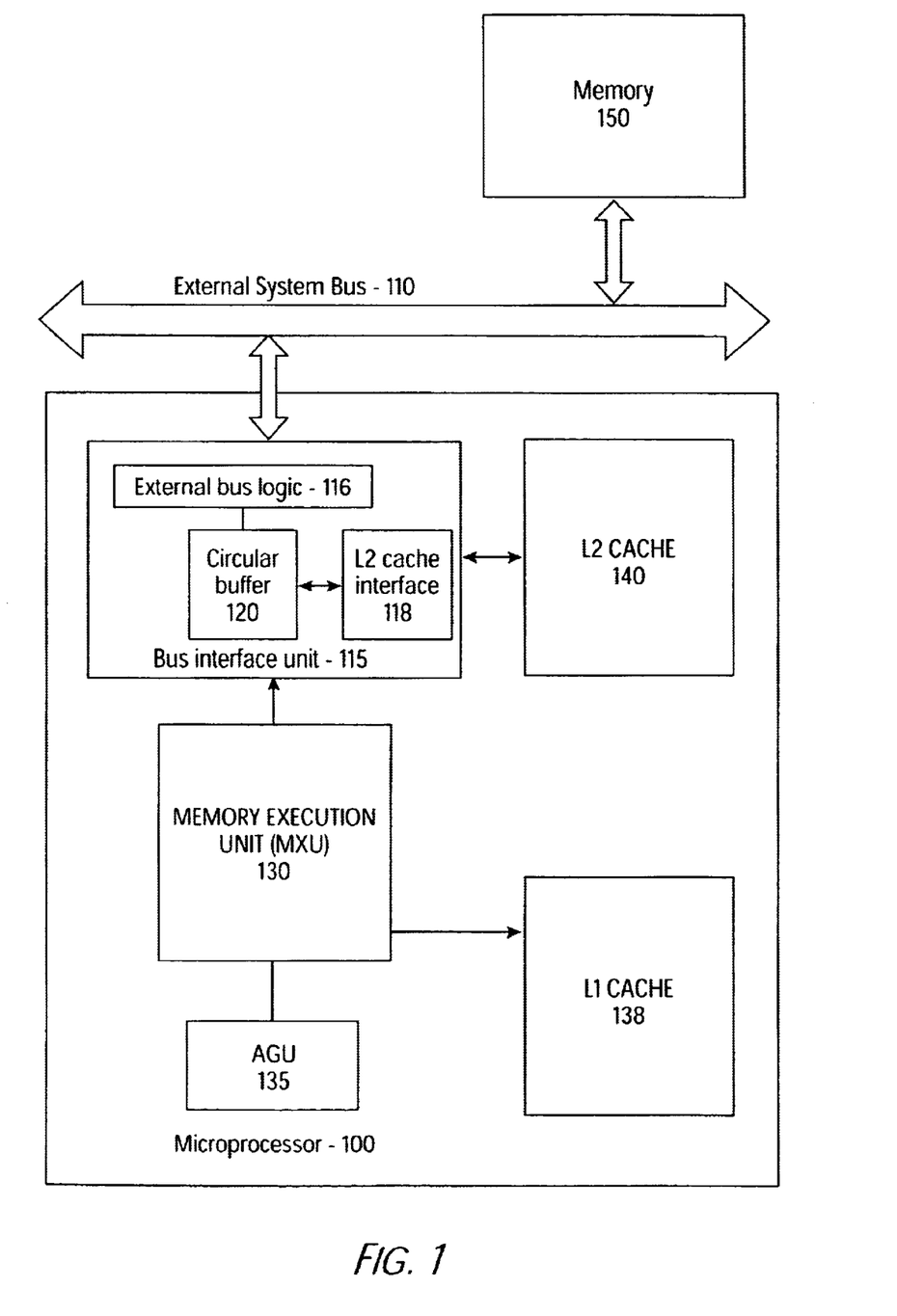
FIG. 1 shows a schematic block diagram illustrating a memory system including a microprocessor.

FIG. 1 shows an embodiment of a memory request system including a microprocessor 100, a system bus 110 and system memory 150. The microprocessor, which may be, for example, an Intel Pentium® or Pentium® Pro microprocessor, includes an address generation unit ("AGU") 135, a memory execution unit ("MXU") 130, a local level-one ("L1") cache 138, a local level-two "L2" cache 140, and a bus interface 115. The bus interface 115, which is coupled to the system bus 110 includes external bus logic 116, an L2 cache interface 118, and a circular buffer 120. The buffer can be implemented as any generalized memory, such as SRAM or registers.

A request directed to memory, either a read or write, originates at the MXU 130, which sends the request to the L1 cache 138 or the bus interface 115, where it is temporarily stored in the buffer 120. The target addresses for the requests are generated in conjunction with the AGU 135. As will be described in greater detail below, the buffer sends requests it has received through the L2 cache interface 118 to the L2 cache 140, to determine if the request can be executed locally, eliminating the need to send the request onto the system bus. If the request cannot be executed at the L2 cache, the request is sent back to the buffer 120, which then schedules the request as "pending", awaiting the issuance of a bus-request to be placed onto the system bus 110.

Figure 2:
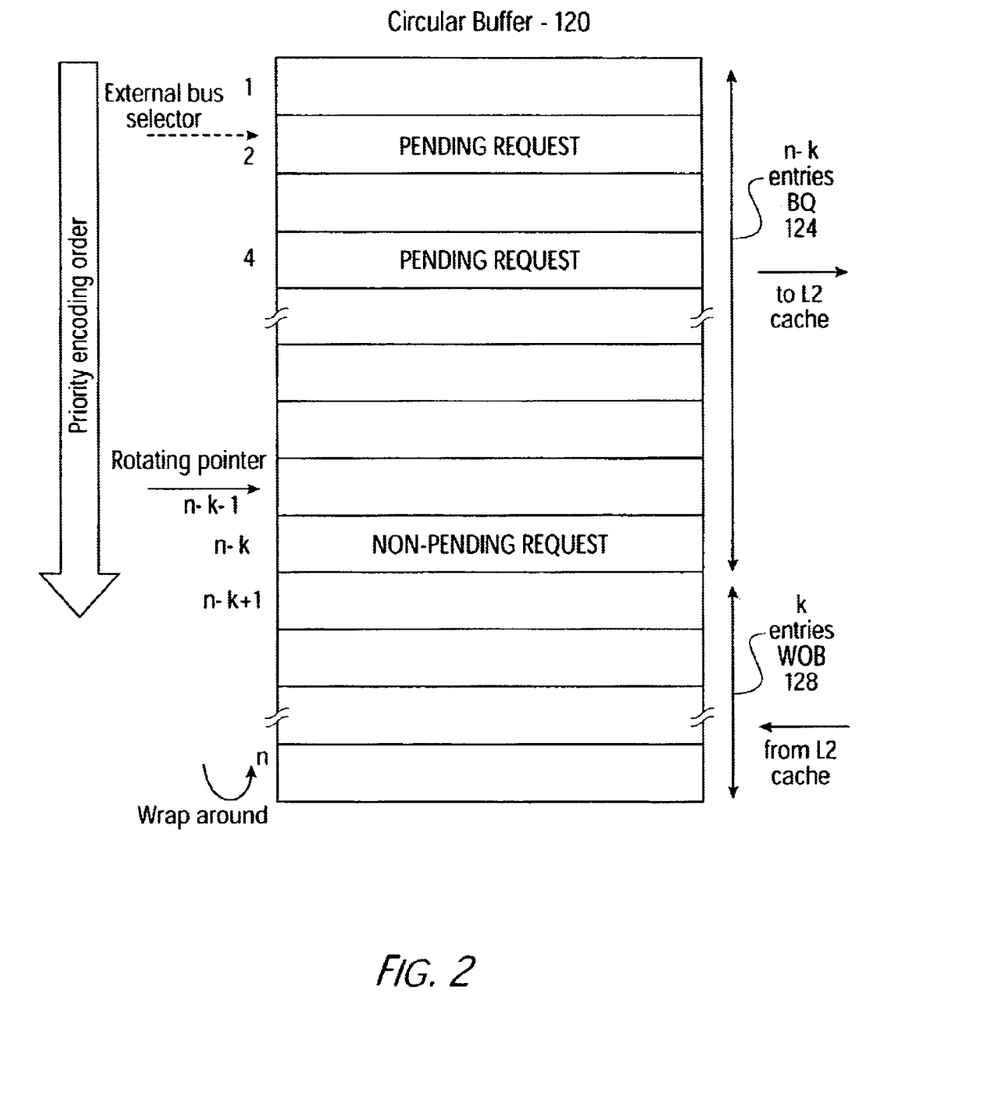
FIG. 2 shows a schematic illustration of an exemplary circular buffer.

FIG. 2 shows a schematic illustration of an embodiment of a circular buffer 120. In a typical implementation, a buffer 120 has a capacity to store n entries, where each entry corresponds to a single read or write request. The buffer is divided into two parts, a bus-queue ("BQ") 124, having a length of n-k entries, which receives memory requests directly from the MXU 130, and a write-out-buffer 128 ("WOB"), k entries in length, which receives cache evictions from the L2 cache 140. The buffer 120 makes bus-requests using a rotating pointer and a priority encoder. As shown in the figure, the rotating pointer points to the n-k-1$^{th}$ entry in the BQ 124. The pointer runs up and down the length of the buffer 120, searching for pending requests. When the rotating pointer reaches a pending request, that request is chosen as the next entry to go out onto the bus 110. The pointer is free-running and wraps around the circular buffer depth, until a pending entry is reached.

The illustrated embodiment of the priority encoder adds a second level to a typical scheduling mechanism. When the rotating pointer points to a non-pending entry, the pending entry with the highest encoded priority is chosen as the next request to be delivered to the bus 110. In FIG. 2, the embodiment of the lowest numbered entries at the top of the BQ 124 are encoded with the highest priority, and priority decreases with increasing depth. In this scheme, requests in the WOB 128, which are below those of the BQ 124, will receive lower priority. As illustrated, an external bus selector pointer points to the pending entry encoded with the highest priority (at entry 2), which will be sent to the bus 110, when the rotating pointer reaches a non-pending request at entry n–k.

Embodiments of the read-write segregation technique use information about the current request pointed to by the rotating pointer, and information about the last request issued to determine whether to issue the current request. An embodiment of this technique is described with reference to the flow chart in FIG. 3 and the schematic illustration in FIG. 4. At the outset in step 200, the rotating pointer currently points to a pending write request at n=8, and the external bus selector currently points to n=3 which is a pending read request. At the starting condition 200, a flag is set that indicates the type of the last issued request. For illustrative purposes, it is assumed that the last issued request was a read request. In step 205, the external bus logic 116 associated with the buffer 120 determines if there are any pending read requests left in the BQ 124. If there are none, the next pending request is issued according to regular rules (step 260) and the initial flag is reset (step 200) according to the newly issued request. In the case where one or more read requests remain in the BQ 124 after a read has just issued, in step 210, bus logic 116 determines whether the rotating pointer points to a pending read request. If the rotating pointer does in fact point to a pending read request, that request is issued (step 212), the rotating pointer increments to the next pending request (step 215) and it is again determined, in step 250, if any pending read requests remain in the BQ 124. If not, the process resorts to regular operation (step 260), and if pending read requests remain, step 210 is repeated.

Figure 3:
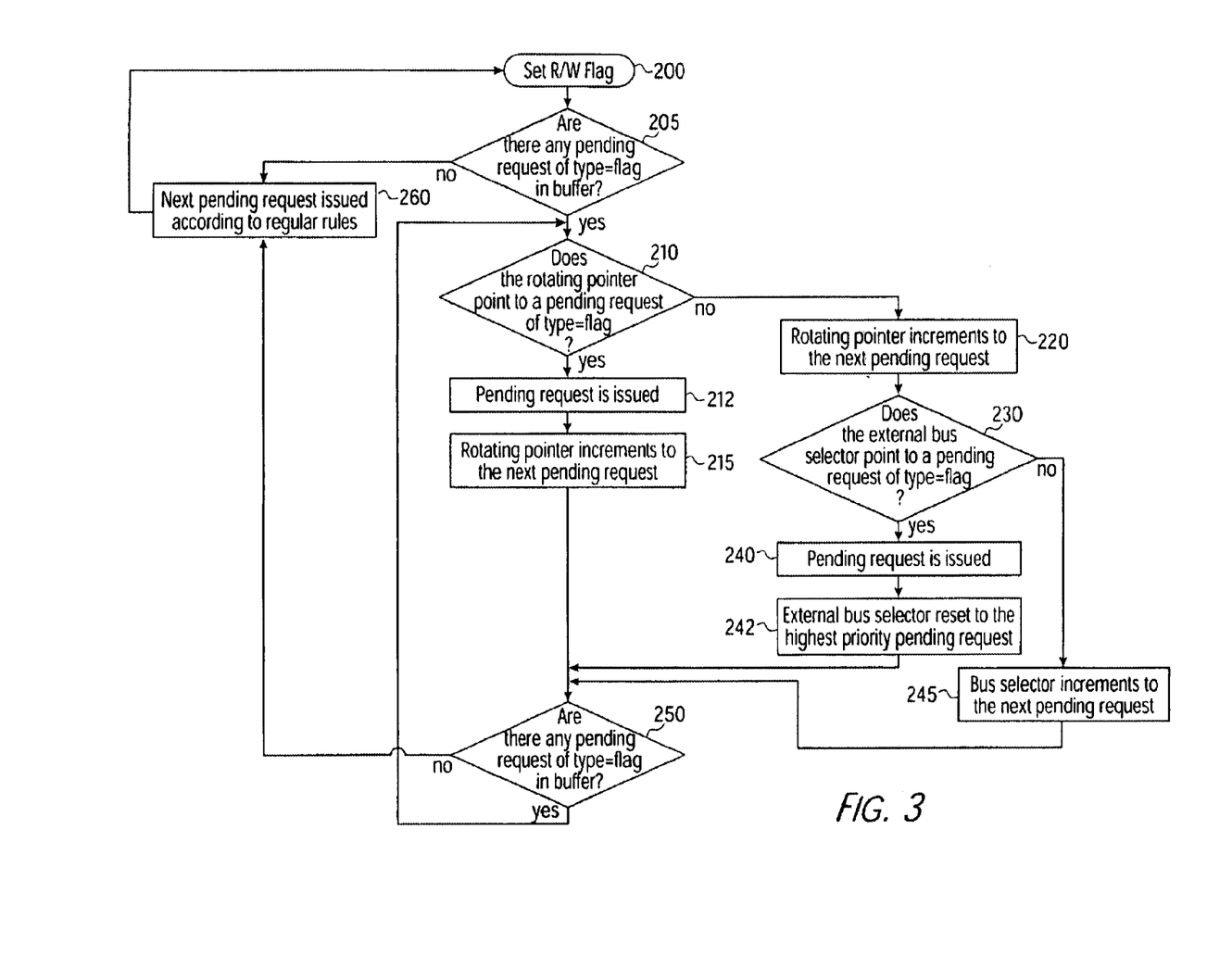
FIG. 3 shows a flow chart of an embodiment of a read-write segregation method according to the present invention.

If the rotating pointer does not point to a pending read request, the rotating pointer increments to the next pending request (step 220) and the bus logic 116 next determines, in step 230, whether the external bus selector points to a pending read request. If the external bus selector points to a pending read request, the request issues in step 240, and the bus selector is reset to the highest priority request (step 242). If the external bus selector does not point to a pending read request, the bus selector afterwards selects a pending request lower in encoded priority (step 245). In step 250, the bus logic 116 again determines whether any pending read requests remain in the BQ 124. If not, regular operation resumes, and if so, the process cycles back to step 210.

Figure 4:
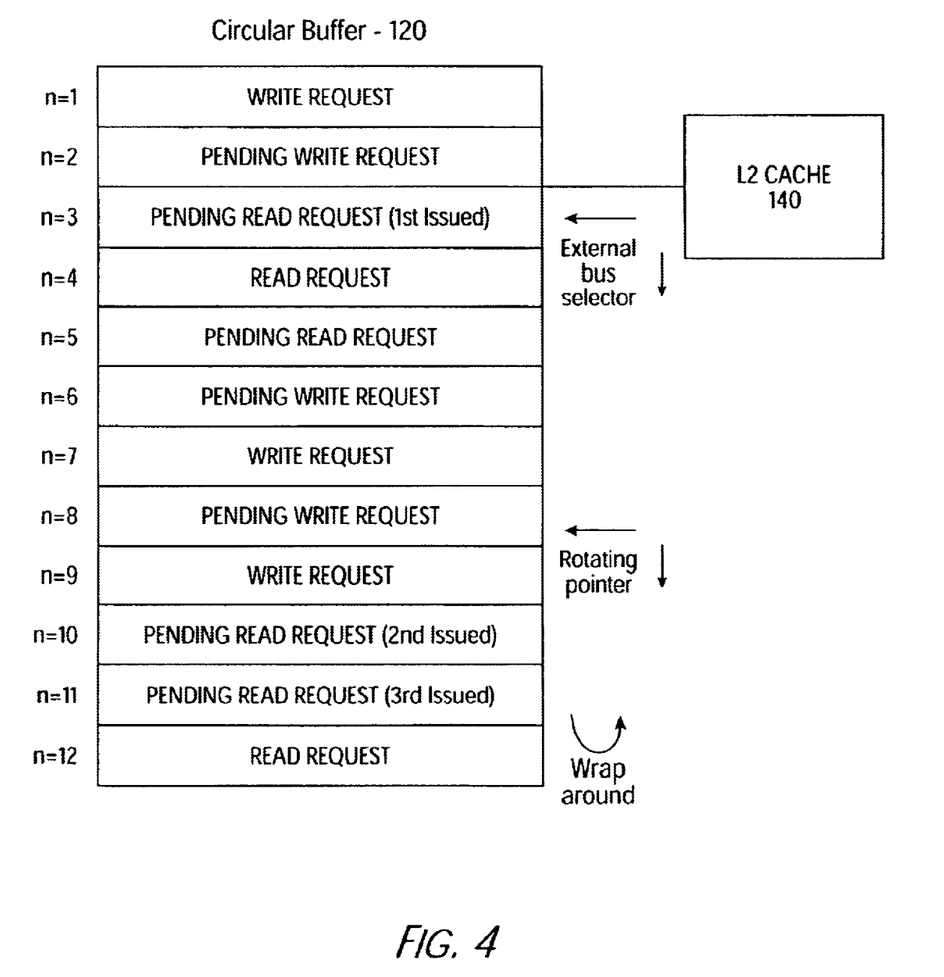
FIG. 4 illustrates a circular buffer and L2 cache according to an embodiment of the read-write segregation method of the present invention.

In the example shown in FIG. 4, the external bus selector points to a read request at n=3, and this request is therefore chosen as the next issued request because the rotating pointer points to a write request at n=8. After the request at n=3 is issued, and both the rotating pointer and the external bus selector cycle through increments until they reach pending read requests at n=10, and n=5 respectively. Because the rotating pointer takes precedence over the priority encoder, the pending read request at n=10 and also the pending read at n=11 issue before the pending read request at n=5. This technique offers the advantage that all pending requests of a given type (read or write) are sent out consecutively in a block before any requests of the opposite type are sent out. Turnaround delays incurred between execution of read and write requests are thereby minimized because of the reduced number of alternating issuances of read and write requests.

Embodiments of temporal request reordering can be used in conjunction with read-write segregation to help ensure that requests sent from the MXU 130 into the BQ 124 in a certain order are issued to the system bus 110 in the same order. Each entry sent from the MXU 130 to the circular buffer 120 may be assigned a vector of length n bits, n being equal to the number of entries in the buffer. When the initial assignment is made, each bit in the assigned vector corresponds to an entry in the circular buffer 120. Where an nth entry in the circular buffer 120 holds a pending request, the corresponding bit in the assigned vector stores a '1'. Each issuance of a prior pending request clears the corresponding bit in the n-bit assignment vector of each of the remaining entries.

Figure 5:
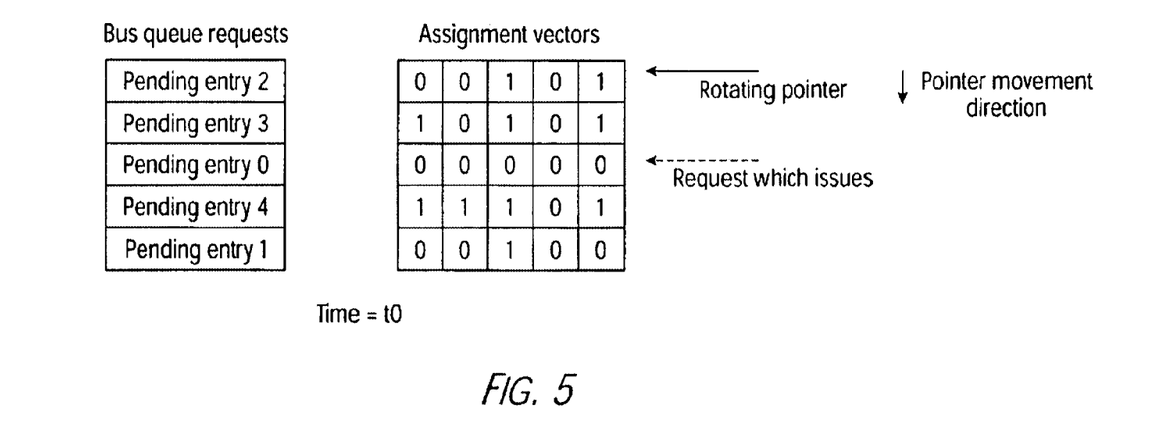
FIGS. 5 and 5A illustrate exemplary n-entry bus queue entries with associated n-bit assignment vectors at two successive issuance cycles.
Figure 5A:
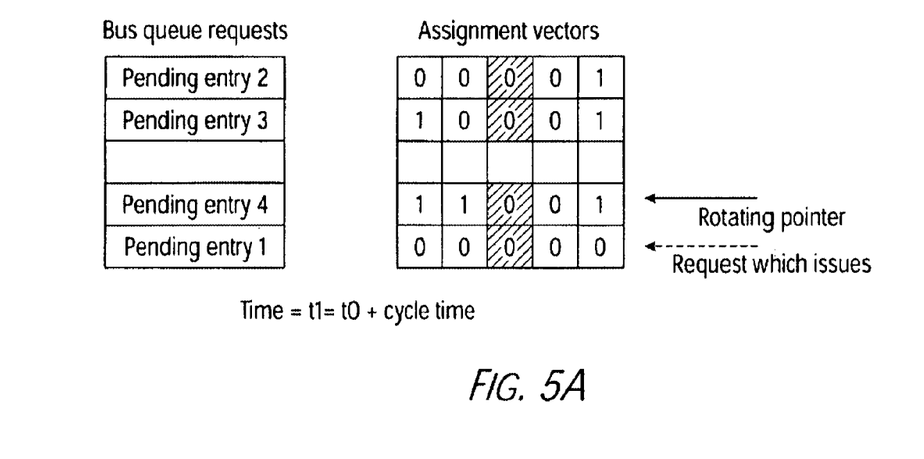

Exemplary samples of entries and their corresponding assignment vectors are shown in FIGS. 5 and 5A. In the figures, for illustrative purposes, a buffer having n=5 entries is shown with corresponding vectors 5 bits in length. As can be discerned, the order of the entries within the circular buffer 120 does not necessarily correspond to the temporal order in which they were originally entered. In FIG. 5, at time arbitrarily designated t=t0, the rotating pointer is aligned with pending entry 2, and therefore, in the absence of any temporal ordering mechanism, pending entry 2 would issue to the system bus 110 before pending requests 0 and 1, which are positioned behind request 2 in the movement direction of the rotating pointer. With the pointer at pending request 2, the bits within the corresponding assignment vector are examined to determine whether any of the bits contains a '1'. The determination can be carried out serially, by checking each vector sequentially or in parallel by summing all the bits of each vector simultaneously. In either case this determines the entry whose vector bits are all '0' and hence sum to zero. This entry is then issued to the system bus 110. In FIG. 3, the pointer would reach pending entry 0, which would be issued.

In an embodiment of the temporal ordering mechanism, when a request located at the m$^{th}$ entry in the buffer issues, the m$^{th}$ bit in each assignment vector is changed from a one to a zero. In this manner, each assignment vector records when any request that temporally precedes it issues, and the vector thereafter reflects the number and location of remaining requests that are ahead of it in temporal order. Accordingly, each remaining '1' in the assignment vector of a particular request represents a request that will be issued before it using the temporal ordering mechanism. FIG. 5A shows the same buffer entries at time t=t1, after pending entry 0 has issued and post-issuance processing has taken place. As shown in the figure, the shaded bits in the assignment vectors are bits that have changed from '1' to '0' in accordance with the temporal ordering mechanism. In the figure, the respective $3^{rd}$ bits of the assignment vectors for pending entries 1 to 4 are changed to zero because pending entry 0 issued from the $3^{rd}$ entry location in the buffer.

The processing scheme described above involving summing the bits of assignment vectors and determining whether the bits sum to zero is particularly advantageous because of the comparatively light demands it makes on the computational resources of the bus logic 116. Although parallel sums of n-bit assignment vectors may require non-trivial memory allocations when the buffer length is large, it is found that this cost is more than balanced by the processing efficiency associated with the mechanism.

Figure 6:
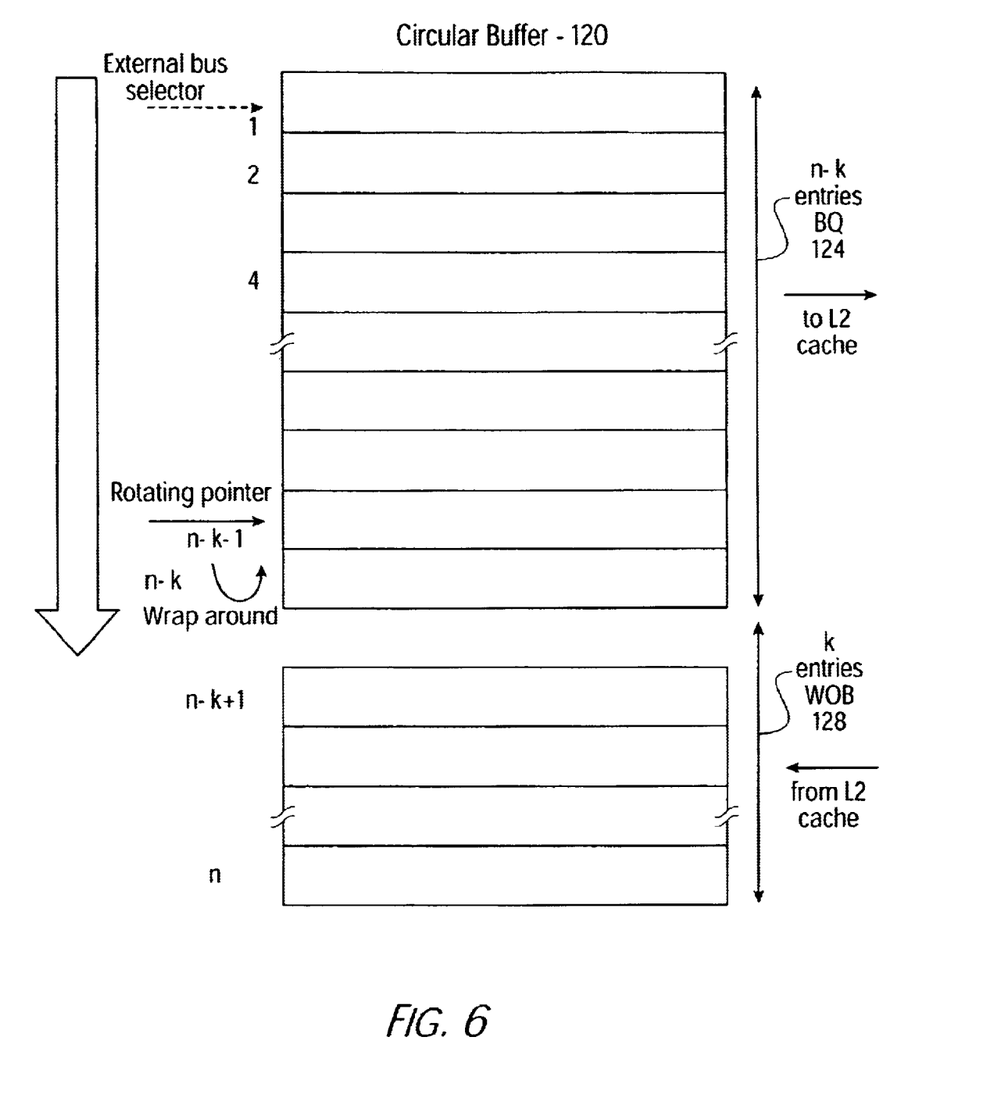
FIG. 6 illustrates a circular buffer and L2 cache according to an embodiment of the lazy writeback mechanism for cache evictions.

When used in conjunction with read-write segregation, the temporal request ordering mechanism ensures that within a block of issued read or write requests, the order assigned to the requests by the MXU 130 is maintained, with older requests preceding newer requests. In addition, a lazy writeback mechanism for cache evictions is provided to further filter higher priority requests from those of lesser priority. FIG. 6 shows an implementation of a circular buffer illustrating the lazy cache writeback mechanism according to an embodiment of the invention.

As shown in the figure, the rotating pointer is restricted to the BQ 124 entries, and wraps around at the end of the BQ, rather than at the end of the circular buffer 120 (which is at the bottom of the WOB 128 area). Being restricted in this fashion, the rotating pointer cannot select entries in the WOB 128 that have been evicted from the L2 cache 140 for issuance to the system bus 110. The only route remaining for cache eviction requests in the WOB 128 to be issued is through the external bus selector. However, because the external bus selector selects entries according to encoded priority, and the WOB 128 is positioned below the BQ 124 in priority, WOB cache evictions cannot be issued until there are no pending read or write requests left in the BQ. In FIG. 6, the last k entries of the buffer, which are designated as the WOB 128, are shown separated from the n–k entries in the BQ 124. The wrap around point for the rotating pointer is at the n–$k^{th}$ entry, indicating that the rotating pointer does not reach the WOB 128.

This embodiment of the lazy writeback of cache eviction technique also has a natural safety-valve mechanism if the WOB 128 becomes filled to capacity with cache evictions. When the WOB 128 is filled to capacity, the L2 cache interface 118 prohibits transmission of requests directed to the L2 cache 140 from the BQ 124 so that new requests cannot generate further cache evictions that would require a WOB entry. Prohibiting the BQ 124 from sending L2 requests to the L2 cache 140 in turn prevents non-pending BQ requests from becoming pending. As a result, the external bus selector eventually reaches the WOB 128, and cache evictions issue to the system bus 110. The lazy writeback mechanism improves the scaling of performance, measured in cycles per instruction, with MXU frequency, keeping the system bus frequency constant, by mitigating the effect of writeback requests on scheduling of critical reads and writes.

In the foregoing description, the method and system of the invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. For example, although it is assumed that the three embodiments of the mechanisms described: read-write segregation, temporal request ordering, and lazy writeback of cache evictions, can be used in concert to improve performance, embodiments of each mechanism can also be used separately or in varying combinations, in a given buffer implementation. Furthermore, while the mechanisms described can be embodied in hardware within a computer processor, the invention is not necessarily limited thereby, and the programmed logic that implements the mechanisms can be separately embodied and stored on a storage medium, such as read-only-memory (ROM) readable by a general or special purpose programmable computer, for configuring the computer when the storage medium is read by the computer to perform the functions described above.

What is claimed is:

1. A method for scheduling pending requests in a buffer for issuance to system memory via a system bus, comprising:

determining the type of a request entry in a buffer;

issuing the request to system memory if the request is pending and at least one of the following conditions is true:

a) the request is of the same type as a last issued request; and b) there are no entries remaining in the buffer having the same type as the last issued request; and repeating the previous processes for another request in the buffer according to a selection order.

2. The method of claim 1, wherein the buffer is a circular buffer.

3. The method of claim 2, wherein the selection order is determined by both a rotating pointer and a priority encoder, the rotating pointer having precedence over the priority encoder.

4. A bus interface unit of a microprocessor, comprising:

a buffer; and a bus logic unit, the bus logic unit determining the type of a request entry in a buffer, and issuing the request to system memory if the request is pending and at least one of the following conditions is true:

a) the request is of the same type as a last issued request; and b) there are no entries remaining in the buffer having the same type as the last issued request;

wherein the bus logic unit repeats the determination and conditional issuance processes for another request in the buffer according to a selection order.

5. The buffer interface unit of claim 4, wherein the buffer is a circular buffer.

6. The buffer interface unit of claim 4, wherein the buffer includes a rotating pointer and a priority encoder.

7. A method for scheduling pending requests in a buffer to be issued to system memory, comprising:

associating a request sent to a buffer with an n-bit identifier, the identifier designating a time at which the request was originally generated;

determining subsequently if the request was generated before any other pending requests in the buffer based upon the identifier associated with the request; and issuing the request if it is pending and if it is determined that the request was generated before any other pending requests.

8. The method of claim 7, wherein the identifier is an n-bit vector, n being equal to the number of entries that can be stored in the buffer.

9. A method for identifying entries in a buffer to enable the entries to be issued to a system bus in a temporal order, comprising:

associating a request with an identifier, the identifier being an n-bit vector, n being equal to the number of entries that can be stored in the buffer.

10. The method of claim 9 further comprising storing a 1 in a bit of the identifier if the correspondingly numbered entry in the buffer contains a pending request.

11. A method of issuing requests from a buffer to a system bus in temporal order, in which requests are associated with an identifier, the identifier being an n-bit vector, n being equal to the number of entries that can be stored in the buffer, the vectors originally including, in any given bit m, a 1 if the corresponding entry numbered m in the buffer contains a pending request, comprising:

determining a pending request at an entry numbered X, whose corresponding identifier includes only zero bit values;

issuing the determined request at entry X to the system bus; changing the Xth bit of the identifiers of each of the requests remaining in the buffer, to zero; and repeating the previous processes.

12. The method of claim 11, wherein the buffer is a circular buffer.

13. A method of increasing the efficiency of bus request scheduling in a buffer, comprising:

segregating lower priority cache eviction requests in a separate write-out section of the buffer separate from a bus-queue section; and selecting request entries in the write-out section for issuance to a system bus only when there are no pending requests in the bus-queue.

14. The method of claim 13, further comprising:

restricting a rotating pointer selector to a section of the buffer that does not include the write-out buffer.

15. The method of claim 14, further comprising:

encoding entries in the write-out buffer with a lower priority than other entries in other sections of the buffer;

wherein an external bus selector chooses entries in encoded priority order, higher before lower.

16. An article comprising a computer-readable medium which stores computer-executable instructions for causing buffer logic to:

determine the type of a request entry in a buffer;

issue the request to system memory if the request is pending and at least one of the following conditions is true:
a) the request is of the same type as a last issued request; and
b) there are no entries remaining in the buffer having the same type as the last issued request; and repeat the previous processes for another request in the buffer according to a selection order.

17. The article of claim 16, which further stores instructions causing buffer logic to determine selection order by both a rotating pointer and a priority encoder, the rotating pointer having precedence over the priority encoder.

18. A method for scheduling pending requests in a buffer for issuance to system memory via a system bus, comprising:

segregating read from write requests;

maintaining the temporal order of the requests; and preventing cache writeback requests from issuing ahead of other types of requests.

19. A method for scheduling pending requests in a buffer for issuance to system memory via a system bus, comprising:

segregating read from write requests;

maintaining the temporal order of the requests;

preventing cache writeback requests from issuing ahead of other types of requests;

issuing the request to system memory if the request is pending and at least one of the following conditions is true:
a) the request is of the same type as a last issued request; and
b) there are no entries remaining in the buffer having the same type as the last issued request; and repeating the previous processes for another request in the buffer according to a selection order.

20. The method of claim 19, further comprising:

associating a request sent to a buffer with an identifier, the identifier designating a time at which the request was originally generated;

determining subsequently if the request was generated before any other pending requests in the buffer based upon the identifier associated with the request; and issuing the request if it is pending and if it is determined that the request was generated before any other pending requests.

21. A method of preserving a static temporal ordering of buffered requests of a particular type for issuance to system memory, comprising:

associating a request sent to a buffer with an identifier, the identifier designating a time at which the request was originally generated;

determining subsequently if the request was generated before any other pending requests in the buffer based upon the identifier associated with the request; and issuing the request if it is pending and if it is determined that the request was generated before any other pending requests;

wherein no later-generated request is issued to system memory before an earlier-generated request of the same type.

* * * * *